(12) United States Patent
Miller et al.

(10) Patent No.: US 7,363,809 B2
(45) Date of Patent: Apr. 29, 2008

(54) METHODS AND SYSTEMS FOR PROVIDING AIR DATA PARAMETERS USING MASS FLOW AND PRESSURE SENSORS

(75) Inventors: Robert D. Miller, Apple Valley, MN (US); Steven H. Thomas, Brooklyn Center, MN (US)

(73) Assignee: Honeywell International Inc., Morristown, NJ (US)

( * ) Notice: Subject to any disclaimer, the term of this patent is extended or adjusted under 35 U.S.C. 154(b) by 18 days.

(21) Appl. No.: 11/295,328

(22) Filed: Dec. 5, 2005

(65) Prior Publication Data

US 2007/0022807 A1 Feb. 1, 2007

Related U.S. Application Data

(60) Provisional application No. 60/703,991, filed on Jul. 29, 2005.

(51) Int. Cl.
*G01P 13/00* (2006.01)
(52) U.S. Cl. .................... 73/170.02; 73/170.11
(58) Field of Classification Search ............ 73/170.02, 73/170.01, 182, 170.11, 170.07
See application file for complete search history.

(56) References Cited

U.S. PATENT DOCUMENTS

| | | | |
|---|---|---|---|
| 4,152,938 A | | 5/1979 | Danninger |
| 4,186,602 A | * | 2/1980 | Blatter et al. ............ 73/861.82 |
| 4,404,858 A | * | 9/1983 | Blechinger ............... 73/861.02 |
| 4,440,027 A | * | 4/1984 | Focht ...................... 73/861.24 |
| 5,025,661 A | | 6/1991 | McCormack |
| 5,438,880 A | | 8/1995 | Washburn |
| 5,515,735 A | * | 5/1996 | Sarihan ................... 73/861.47 |
| 6,076,963 A | | 6/2000 | Menzies et al. |
| 6,490,510 B1 | | 12/2002 | Choisnet |
| 6,557,423 B1 | | 5/2003 | Vozhdaev et al. |
| 6,672,152 B2 | | 1/2004 | Rouse et al. |
| 6,817,240 B2 | | 11/2004 | Collot et al. |
| 2005/0273292 A1 | | 12/2005 | Severson et al. |
| 2006/0027702 A1 | * | 2/2006 | Rouse et al. ............. 244/17.13 |

* cited by examiner

*Primary Examiner*—Andre J. Allen
(74) *Attorney, Agent, or Firm*—Black Lowe & Graham PLLC

(57) ABSTRACT

A system is described that is configured to determine a plurality of air data parameters for an air vehicle. The system includes a mass air flow sensor, a pressure sensor, and a controller. The mass air flow sensor is mounted to sense an air flow caused by movement of the air vehicle. The pressure sensor is mounted to sense a static pressure at the air vehicle. The controller is configured to receive signals from the mass air flow sensor and the pressure sensor and determine an air velocity and a static pressure using the received signals.

19 Claims, 2 Drawing Sheets

Molecules at higher temperature or at lower pressure (i.e. high altitude)

Mass flow constant (gm/sec), volumetric flow increases; cm³/sec

Molecules at lower temperature or at higher pressure (i.e. low altitude)

Mass flow constant (gm/sec), volumetric flow decreases; cm³/sec

METHODS AND SYSTEMS FOR PROVIDING AIR DATA PARAMETERS USING MASS FLOW AND PRESSURE SENSORS

CROSS REFERENCE TO RELATED APPLICATIONS

This application claims priority to U.S. Provisional Application Ser. No. 60/703,991, filed Jul. 29, 2005, which is hereby incorporated by reference in its entirety.

BACKGROUND OF THE INVENTION

This invention relates generally to air data properties of air vehicles, and more specifically, to methods and systems for providing air data parameters using mass flow and pressure sensors.

Air data properties are important in maintaining optimum performance of air vehicles. Three air data parameters include altitude, velocity, and mach number. Pressure altitude is a function of static pressure and is used to determine a quantity of flight conditions. For example, a decrease in pressure is typically indicative of an increase in altitude. Also, as pressure decreases, air density decreases. Air density is also a function of static air temperature. For example, if one plane is flying at sea level and one is flying at 10000 feet they both could be indicating 300 knots but the higher vehicle is actually flying faster. This phenomenon becomes more pronounced at higher altitudes.

Velocity is a function of impact pressure (i.e. the total pressure minus the static pressure). Velocity is the most common parameter used to control air traffic and other aircraft maneuvers. Velocity, as well as air density, is used to control fuel consumption and required power needed to fly at cruise conditions.

The mach number is the ratio of air vehicle speed and the speed of sound. As the air vehicle moves through the air, the air molecules near the air vehicle are disturbed and move around the air vehicle. If the air vehicle is moving at a relatively low speed, for example, less than 250 mph, the density of the air flow remains relatively constant.

At higher air vehicle speeds, some of the energy from the air vehicle compresses the air and locally changes a density of the air. This compressibility effect alters the amount of the resulting force on the air and becomes more important as speed increases. Near and beyond the speed of sound, about 330 meters per second or 760 mph at sea level, small disturbances in the flow are transmitted to other locations. Such disturbances have a constant entropy. For example, a sharp disturbance may generate a shock wave that could affect both the lift and drag of the air vehicle. As a result, the mach number is an important air data parameter that is used to control the performance of the air vehicle. The mach number also changes as a function of altitude.

As such, the air data parameters are very important in large aircraft and it may be considered flight critical. These parameters provide precision inputs for flight control. The air data computers that monitor these parameters tend to be high cost items because of accuracy requirements and complexity. For example, some air data systems are configured to be dual and triple redundant and incorporate very high precision and accurate pressure sensors. Extensive characterization procedures are also required to assure the air data computer system meets the desired performance levels.

In smaller air vehicles such as targets, missiles, and unmanned air vehicles (UAVs), the accuracy of the air data parameters is typically less critical. However, they are still important if air vehicle optimum performance is to be achieved. These air vehicle types are typically relatively low in cost and as such, any air data system incorporated therein must also be low cost.

BRIEF SUMMARY OF THE INVENTION

In one aspect, a system configured to determine a plurality of air data parameters for an air vehicle is provided. The system comprises a mass air flow sensor mounted to sense an air flow caused by movement of the air vehicle, a pressure sensor mounted to sense a static pressure at the air vehicle, and a controller. The controller is configured to receive signals from the mass air flow sensor and the pressure sensor. The controller is further configured to determine an air velocity and a static pressure using the received signals.

In another aspect, a method for determining an air velocity for an air vehicle is provided. The method comprises mounting a mass air flow sensor to sense an air flow caused by movement of the air vehicle, mounting a pressure sensor to sense a static pressure at the air vehicle, and configuring a controller to receive signals from the mass air flow sensor and the pressure sensor and determine the air velocity using the received signals.

In still another aspect, an air data system is provided. The air data system comprises a mass air flow sensor, a pressure sensor, a probe configured to provide an airflow across the air flow mass sensor and allow an ambient pressure to contact the pressure sensor, and a controller. The controller is configured to determine an air velocity based on signals received from the mass air flow sensor and the pressure sensor.

DETAILED DESCRIPTION OF THE INVENTION

Figure 1:
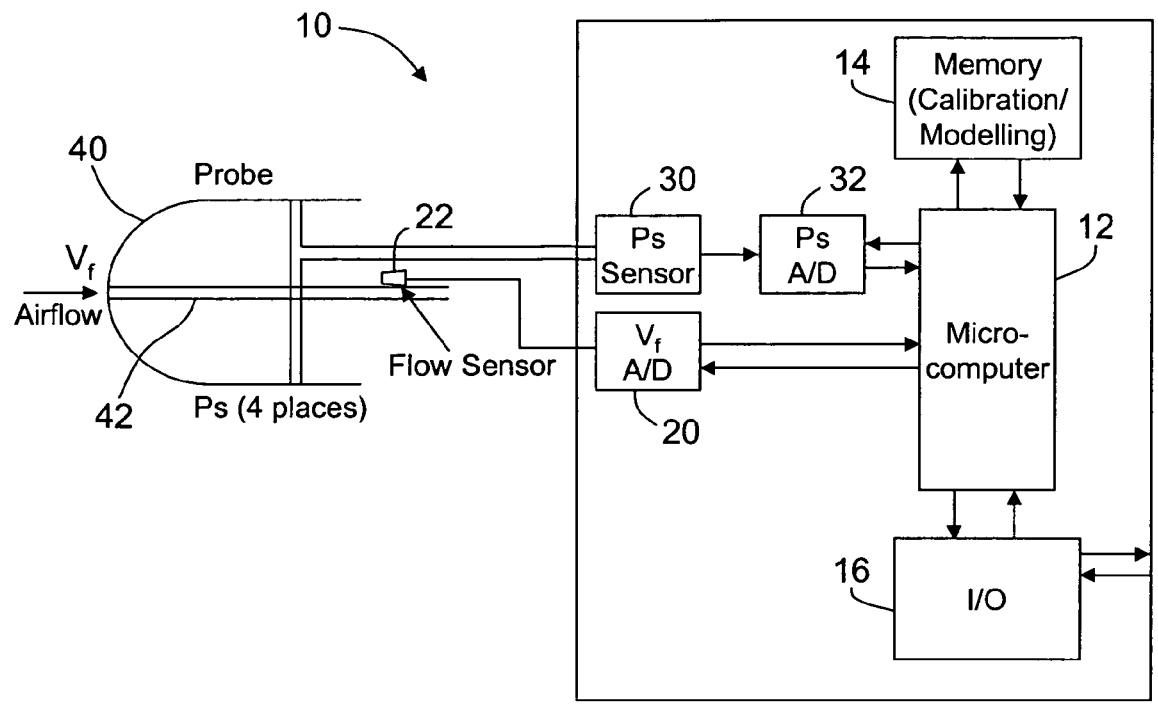
FIG. 1 is a block diagram of a system for determining air data parameters for an air vehicle.

A low cost air data solution can be achieved by using a combination of a low cost mass flow sensor and a cost effective static pressure sensor. More specifically, FIG. 1 is a block diagram of an air data system 10 for determining air data parameters. System 10 includes a microcomputer 12, memory 14 and input/output (I/O) circuits 16 which are sometimes collectively referred to as a controller.

A mass air flow sensor 20 provides air mass flow data (e.g., a velocity) to a velocity analog-to-digital converter (ADC) 22, which is interfaced to microcomputer 12. A pressure sensor 30 provides pressure data to a pressure ADC 32, which is interfaced to microcomputer 12. System 10 includes a probe 40 which includes a number of ports formed therein. A velocity port 42 is located along a longitudinal axis of probe 40 and allows an airflow across mass air flow sensor 20 which is placed adjacent velocity port 42. Pressure ports 44, 46, 48, and 50 are formed substantially perpendicularly to velocity port 42. Pressure ports 44, 46, 48, and 50 are interconnected, for example, by a hollow ring 52 formed within a perimeter of probe 40. Hollow ring 52 is configured to allow static pressure to contact pressure sensor 30.

Figure 2:
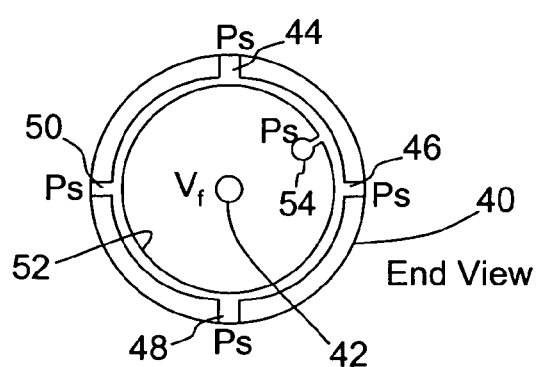
FIG. 2 is an end cross-sectional view of a probe incorporated into the system of FIG. 1.

FIG. 2 is a cross-sectional end view of probe 40 illustrating velocity port 42 and the pressure ports 44, 46, 48, and 50, along with hollow ring 52. FIG. 2 further illustrates that a secondary port 54 may be located within hollow ring 52 of probe 40 that measures the average pressure at the other static pressure (Ps) ports, allowing the pressure to be applied to pressure sensor 30.

An air velocity, Vf, is measured using mass flow sensor 20 and static pressure, Ps, from pressure sensor 30. Additional air data parameters can be determined from these two measurements. More specifically, the static pressure, Ps, is utilized to correct a pressure dependency of air velocity, Vf, to produce an accurate determination of air flow, Vc, which is referred to as a calibrated air velocity, which is also sometimes referred to as CAS.

From air flow and static pressure, a pressure altitude (Hp), a total pressure (Pt), and a mach number can be derived as shown by the following formulas:

$$CAS = Vc = a_o \left[ 5 \left\{ \left( \frac{Qc}{p_o} + 1 \right)^{2/7} - 1 \right\} \right]^{.5} \text{ where,}$$

$$a_o = 661.4786 \text{ kts and } p_o = 29.92126 \text{ inHg}.$$

Therefore, knowing Vc, then Qc, the difference between total pressure and static pressure can be derived:

$$Qc = f(Vc) = p_o \left[ \left\{ \frac{1}{5} \left( \frac{Vc}{a_o} \right)^2 + 1 \right\}^{3.5} - 1 \right]$$

Qc=Pt−Ps; therefore Pt=Qc+Ps and the mach number, M, can then be determined:

$$M = 2.236068 * \left[ \left( \frac{Pt}{Ps} \right)^{0.2857142} - 1 \right]^{0.5} = 2.236068 * \left[ \left( \frac{Qc}{Ps} + 1 \right)^{0.2857142} - 1 \right]^{0.5}$$

Pressure altitude, Hp, can be calculated knowing Ps:

$$Hp = \frac{1 - \left( \frac{Ps}{Po} \right)^{0.19026}}{6.875586 \times 10^{-6}} for Hp \leq 36 \, Kft; \quad Po = 29.92126 \, inHg$$

$$Hp = -20805.85 \times 1n\left( \frac{Ps}{6.68322} \right) + 36089.23;$$

for 36K ... ft < Hp > 65.6 Kft $$Hp = 65616.7979 + 710793.9632 \left[ \left( \frac{Ps}{1.61673394} \right)^{-.0292712672} - 1 \right];$$

for 65616.79 ft < Hp < 104986.87 ft.

In one embodiment, flow sensor 22 incorporates microbridge technology, such that flow sensor 22 is configured to operate in harsh environments. In addition, flow sensor 22 is capable of sensing extended air mass flow rates of more than 30 grams per square centimeter per second. In one embodiment, flow sensors have a range of 1000:1 (i.e. the sensors can sense mass flow rates from 30 gm/cm$^2$/sec to 0.030 gm/cm$^2$/sec). Flow sensor 22 is also bi-directional, that is, it can measure air mass flow in both directions.

Microbridge mass air flow sensors, for example, sensor 22, measures actual mass flow of a gas media. Actual flow is driven by a pressure gradient flowing from a higher pressure region to a lower pressure region. Sensor 22 measures air mass flow which is a function of the gas density, the gas density being a function of pressure and temperature. Sensor 22, in one embodiment, is compensated for temperature and therefore does not vary as a function of temperature due to altitude changes.

Figure 3:
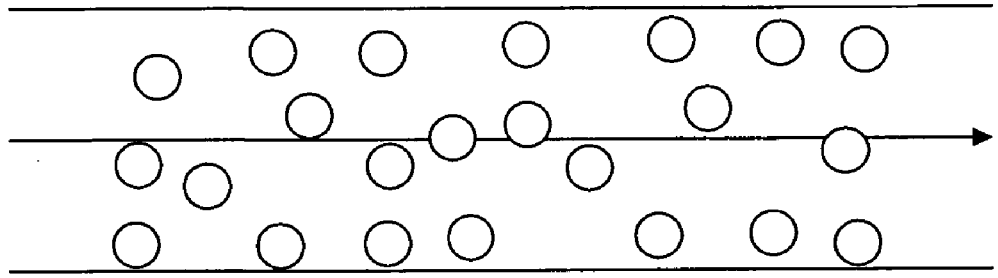
FIG. 3 is a diagram of molecules at a lower temperature and high pressure.
Figure 4:
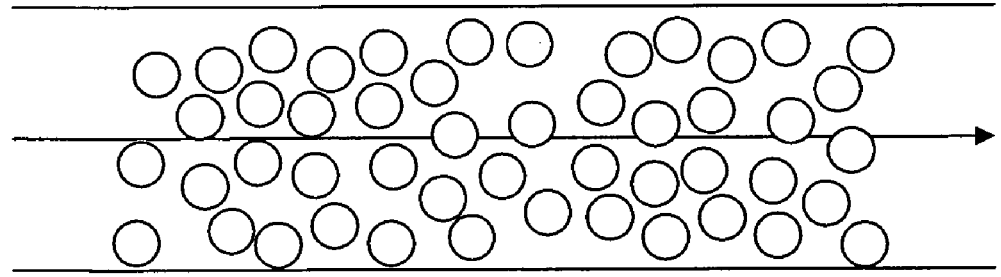
FIG. 4 is a diagram of molecules at a higher temperature and a low pressure.

FIG. 3 is a diagram illustrating the flow of molecules 70 at low temperature and higher pressure, such as would be found at lower altitudes. To keep mass flow constant, volumetric flow, in cubic centimeters/second has to be decreased. FIG. 4 is a diagram illustrating the flow of molecules 80 at a higher temperature and/or at a lower pressure, such as would be found at higher altitudes. To keep mass flow constant, volumetric flow, in cubic centimeters/second has to be increased.

Mass air flow sensor 22 translates to an air flow sensor according to the following gas law equation:

$$Q = \overline{m} \frac{nRT}{mP},$$

where the mass flow rate of air, $\overline{m}$, is measured. The other variables are: n=1, R=82.1 cm$^3$ atm/mole °K, m=mass of air in grams per one mole, P=Pressure in atmospheres (e.g., a function of altitude), and T=temperature in Kelvin (e.g., a function of altitude and impact temperature).

For air, the mass can be calculated based on its composite makeup, in mass/mole, e.g., about 78.8% nitrogen (N$_2$) which is about 28.01 grams per mole, and about 21.2% oxygen (O$_2$) which is about 32.00 grams per mole. For this calculation the approximate 0.9% of argon, and 0.03% of carbon dioxide in the air can be ignored, and the result is that air is about 28.854 grams per mole.

As can be seen by referring to FIGS. 3 and 4 and the above gas law equation, the volumetric flow of air changes as a function of both temperature and pressure.

In one embodiment, mass air flow sensor 22 is also a thermal anemometer, that is, it contains a temperature sensor. As a result, any air mass flow is compensated for temperature during calibration of the sensor 22. Therefore, the air mass flow is only a function of pressure:

$$Q = \overline{m} \frac{nRT}{mP};$$

Therefore, Q is a function of 1/P. Since static pressure, Ps, is measured in system 10 by pressure sensor 30, then Q=Vc can be readily compensated as Ps varies with altitude.

The above described methods and systems provide a low cost, viable air data system that provides calibrated air velocity (Vc), static pressure (Ps), total pressure (Pt), pressure altitude (Hp), and mach number (M) to, for example, a flight control system of an air vehicle.

While the invention has been described in terms of various specific embodiments, those skilled in the art will recognize that the invention can be practiced with modification within the spirit and scope of the claims.

What is claimed is:

1. A system configured to determine a plurality of air data parameters for an air vehicle, said system comprising:
   a mass air flow sensor mounted to sense an air flow across said mass air flow sensor caused by movement of the air vehicle;
   a pressure sensor mounted to sense a static pressure at the air vehicle; and
   a controller configured to receive signals from said mass air flow sensor and said pressure sensor, and said controller further configured to determine an air velocity and a static pressure using the received signals.

2. A system according to claim 1 further comprising a probe, said probe comprising a velocity port formed along a longitudinal axis of said probe, said velocity port configured to provide an airflow across said air flow mass sensor.

3. A system according to claim 1 further comprising a probe, said probe comprising a plurality of interconnected pressure ports formed within a perimeter of said probe, said pressure ports configured to allow a static pressure to contact said pressure sensor.

4. A system according to claim 1 wherein said controller is configured to determine a pressure altitude, Hp, from the static pressure, Ps, according to:

$$Hp = \frac{1-\left(\frac{Ps}{Po}\right)^{0.19026}}{6.875586 \times 10^{-6}} \; for Hp \leq 36 \, Kft; \quad Po = 29.92126 \, inHg$$

$$Hp = -20805.85 \times ln\left(\frac{Ps}{6.68322}\right) + 36089.23;$$

$$\text{for } 36K \ldots \text{ft} < Hp > 65.6 \, Kft$$

$$Hp = 65616.7979 + 710793.9632\left[\left(\frac{Ps}{1.61673394}\right)^{-.0292712672} - 1\right];$$

$$\text{for } 65616.79 \, \text{ft} < Hp < 104986.87 \, \text{ft}.$$

5. A system according to claim 1 wherein said controller is configured to determine a mach number, M, for the air vehicle according to:

$$Vc = a_o\left[5\left\{\left(\frac{Qc}{p_o}+1\right)^{2/7}-1\right\}\right]^{.5} \text{ where,}$$

$$a_o = 661.4786 \, kts \text{ and } p_o = 29.92126 \, inHg,$$

$$Qc = f(Vc) = p_o\left[\left\{\frac{1}{5}\left(\frac{Vc}{a_o}\right)^2+1\right\}^{3.5}-1\right], \text{ where}$$

Qc=Pt−Ps, and therefore Pt=Qc+Ps, and the mach number, M, is determined as:

$$M = 2.236068 * \left[\left(\frac{Pt}{Ps}\right)^{0.2857142}-1\right]^{0.5} = 2.236068 * \left[\left(\frac{Qc}{Ps}+1\right)^{0.2857142}-1\right]^{0.5}.$$

6. A system according to claim 1 wherein said air flow mass sensor comprises a temperature sensor.

7. A method for determining an air velocity for an air vehicle comprising:
   mounting a mass air flow sensor to sense an air flow caused by movement of the air vehicle;
   mounting a pressure sensor to sense a static pressure at the air vehicle;
   configuring a controller to receive signals from the mass air flow sensor and the pressure sensor, and to determine the air velocity using the received signals; and
   providing the determined air velocity to a flight control system of an air vehicle.

8. A method according to claim 7 further comprising:
   configuring a probe with a velocity port formed along its longitudinal axis; and
   mounting the probe to provide an air flow across the mass air flow sensor.

9. A method according to claim 8 further comprising configuring the probe with a plurality of interconnected pressure ports formed within a perimeter of the probe, the pressure ports configured to allow static pressure to contact the pressure sensor.

10. A method according to claim 7 further comprising configuring the controller is configured to determine a pressure altitude, Hp, from the static pressure, Ps, according to:

$$Hp = \frac{1-\left(\frac{Ps}{Po}\right)^{0.19026}}{6.875586 \times 10^{-6}} \; for Hp \leq 36 \, Kft; \quad Po = 29.92126 \, inHg$$

$$Hp = -20805.85 \times ln\left(\frac{Ps}{6.68322}\right) + 36089.23;$$

$$\text{for } 36K \ldots \text{ft} < Hp > 65.6 \, Kft$$

$$Hp = 65616.7979 + 710793.9632\left[\left(\frac{Ps}{1.61673394}\right)^{-.0292712672} - 1\right];$$

$$\text{for } 65616.79 \, \text{ft} < Hp < 104986.87 \, \text{ft}.$$

11. A method according to claim 7 further comprising configuring the controller to determine a mach number, M, for the air vehicle according to:

$$Vc = a_o\left[5\left\{\left(\frac{Qc}{p_o}+1\right)^{2/7}-1\right\}\right]^{.5} \text{ where,}$$

$$a_o = 661.4786 \, kts \text{ and } p_o = 29.92126 \, inHg,$$

$$Qc = f(Vc) = p_o\left[\left\{\frac{1}{5}\left(\frac{Vc}{a_o}\right)^2+1\right\}^{3.5}-1\right], \text{ where}$$

Qc=Pt−Ps, and therefore Pt=Qc+Ps, and the mach number, M, is determined as:

$$M = 2.236068 * \left[\left(\frac{Pt}{Ps}\right)^{0.2857142}-1\right]^{0.5} = 2.236068 * \left[\left(\frac{Qc}{Ps}+1\right)^{0.2857142}-1\right]^{0.5}.$$

12. An air data system comprising:
   a mass air flow sensor;
   a pressure sensor;
   a probe configured to provide an airflow across said mass air flow sensor and allow an ambient pressure to contact said pressure sensor, said mass air flow sensor mounted within said probe; and
   a controller configured to determine an air velocity based on signals received from said mass air flow sensor and said pressure sensor.

13. An air data system according to claim 12 wherein said probe comprises a velocity port formed along a longitudinal axis of said probe, said velocity port configured to provide the airflow across said mass air flow sensor caused by movement of an air vehicle.

14. An air data system according to claim 12 wherein said probe comprises a plurality of interconnected pressure ports formed within a perimeter of said probe, said pressure ports configured to allow a static pressure to contact said pressure sensor.

15. An air data system according to claim 14 wherein said probe comprises a port located within a perimeter formed by the interconnection of said pressure ports, said pressure sensor mounted within said port.

16. An air data system according to claim 12 wherein said controller is configured to receive signals from said mass air flow sensor and said pressure sensor, said controller further configured to determine a velocity using the received signals.

17. An air data system according to claim 16 wherein said controller is configured to utilize a static pressure received from said pressure sensor to correct a pressure dependency of velocity to produce a determination of air flow across said mass air flow sensor.

18. An air data system according to claim 12 wherein said air flow mass sensor comprises a temperature sensor.

19. An air data system according to claim 18 wherein said controller is configured to apply temperature compensation to air mass flows measured by said mass air flow sensor.

* * * * *